United States Patent [19]
Woodson

[11] 3,772,543
[45] Nov. 13, 1973

[54] EDDY-CURRENT SHIELD SUPERCONDUCTING MACHINE

[75] Inventor: Herbert Horace Woodson, Austin, Tex.

[73] Assignee: Massachusetts Institute of Technology, Cambridge, Mass.

[22] Filed: May 25, 1972

[21] Appl. No.: 256,803

[52] U.S. Cl. .................................................. 310/52
[51] Int. Cl. ............................................. H02k 9/00
[58] Field of Search ......................... 310/10, 40, 52

[56] References Cited
UNITED STATES PATENTS

| | | | |
|---|---|---|---|
| 3,644,766 | 2/1972 | Hughes | 310/40 X |
| 3,521,091 | 7/1970 | Halas | 310/40 |
| 3,517,231 | 6/1970 | Massar | 310/52 |
| 3,328,616 | 6/1967 | Ringland | 310/166 |
| 3,368,087 | 2/1968 | Madsen | 310/52 X |
| 3,679,920 | 7/1972 | McNab | 310/52 X |
| 3,242,418 | 3/1966 | Mela et al. | 310/52 X |

*Primary Examiner*—D. F. Duggan
*Attorney*—Joseph S. Iandiorio et al.

[57] ABSTRACT

An eddy-current shield for containing the magnetic field in a cryogenic electrical machine having two relatively rotatable members, an armature and a cryogenic field winding, one of said members being an outer member and the other being an inner member surrounded by the outer member, comprising a symmetric cylindrical shell of electrically conductive material, extending at least co-extensively axially with the members and spaced from the outer of said members, and first and second end elements of electrically conductive material interconnected with the respective ends of the shell and extending radially inwardly toward the axis of the machine.

12 Claims, 2 Drawing Figures

EDDY-CURRENT SHIELD SUPERCONDUCTING MACHINE

FIELD OF INVENTION

This invention relates to an eddy-current shield for containing the magnetic field in a cryogenic electrical machine, and more particularly to such a shield which extends over the ends of the machine and inwardly toward the axis of the machine to prevent flux leakage out the ends of the machine.

BACKGROUND OF INVENTION

In conventionally constructed electrical machines high permeability magnetic steel is used in the armature structure to reduce the amount of power needed to produce the desired amount of flux in the air gap. The large quantity of magnetic material, the stamping of the large number of laminations needed and the assembly of these laminations contribute substantially to the cost of the machine. Furthermore the armature stack constitutes a substantial portion of the machine weight and thus contributes substantially to the machine cost, shipping cost and to the cost of the foundation on which the machine is to be placed. When a cryogenic field winding is used in an electrical machine it can produce all the flux necessary and desirable without any assistance from a high permeability magnetic circuit. However, the high permeability magnetic circuit associated with conventional machines also serves to absorb the magnetic flux and confine it within the frame of the machine so that all the flux remains within the machine boundary. However, without the conventional high permeability magnetic circuit the magnetic flux from the cryogenic field winding can escape the confines of the machine and interact with surrounding objects. To avoid such problems as pulsating forces on the field winding which would result from interaction with metal objects such as building beams, reinforcing rods and the like in the vicinity and to avoid sizable AC magnetic fields in the vicinity of the machine which would affect wristwatches and attract small hand tools and to avoid eddy current losses in surrounding steel structural members, a high permeability steel magnetic shield can be constructed using laminations just as in a conventional machine. However, if such a magnetic shield is used a portion of the great weight saving effected by the use of the cryogenic field winding and the elimination of the high permeability magnetic circuit is lost; it has been suggested that an eddy-current shield rather than a magnetic shield may be used to confine the magnetic field without greatly adding to the weight of the machine. See Basic Formulas for Air-Core Synchronous Machines, J. L. Kirtley, Jr., a paper recommended by the IEEE rotating machinery committee of the IEEE Power Engineering Society for presentation at the IEEE Winter Power Meeting, N.Y., N.Y., Jan. 31, 1970 through Feb. 5, 1971; manuscript submitted Sept. 14, 1970, made available for printing Nov. 18, 1970 and The Application of Superconductors in the Field Winding of Large Synchronous Machines, H. H. Woodson, J. L. Smith, Jr., P. Thullen, and J. L. Kirtley, IEEE Transactions on Power Apparatus and Systems, Vol. PAS-90, No. 2, March/April 1971, Pages 620–627. These shields proved less than totally effective, for with conventional high permeability steel magnetic circuits the flux is all absorbed in the magnetic circuit and does not escape the machine. However, an eddy-current shield does not absorb flux, rather it uses a second magnetic field resulting from eddy currents generated in the shield by the primary magnetic field; this second magnetic field suppresses the primary magnetic field rather than absorbs it and therefore permits some flux to leak out the ends of the machine.

SUMMARY OF INVENTION

It is therefore an object of this invention to provide a shield for a cryogenic electrical machine which is substantially less heavy than conventional high permeability magnetic circuits but which is substantially as effective as those circuits for confining the magnetic field within the machine configuration.

It is a further object of this invention to provide such a shield which uses an image field created by eddy currents in the shield to confine the primary magnetic field of the machine.

It is a further object of this invention to provide such an eddy-current shield which confines the flux at the ends of the machine as well as about its circumference.

The invention results from the realization that, because an eddy-current shield by means of an image field suppresses the primary field instead of absorbing that field as in the case of conventional machine having high permeability magnetic circuits, there can be leakage of flux out the ends of an eddy current shielded machine.

The invention features an eddy-current shield for containing the magnetic field in a cryogenic electrical machine having two relatively rotatable members, an armature and a cryogenic field winding. One of the members is an outer member and one is an inner member surrounded by the outer member. The shield includes a symmetric, cylindrical shell of electrically conductive material extending at least co-extensively, axially with the members and spaced from the outer member. First and second end elements of electrically conductive material are interconnected with the respective ends of the shell and extend radially inwardly toward the axis of the machine.

DISCLOSURE OF PREFERRED EMBODIMENT

Other objects, features and advantages will occur from the following description of a preferred embodiment and the accompanying drawings, in which.

The invention may be accomplished in a cryogenic electrical machine having an armature and a superconducting field winding; one of the armature and field winding being on the rotor and the other being on the stator. Surrounding and fixed to the stator there may be provided an eddy-current shield of electrically conductive material and preferably of low magnetic permeability. The shield is cylindrically symmetrical about the axis of the machine and extends axially along the machine at least co-extensively with the field winding and armature and typically beyond the ends of the field winding and armature. The eddy-current shield does not terminate at the circumference, however: it includes radially extending end elements which are interconnected with the edge of the circumferential shield and extend inwardly toward the central longitudinal axis of the machine. The shield may be formed of such non-magnetic electrical conductors as copper or aluminum.

In order to reduce power losses due to the eddy currents in the shield and make the machine more efficient a cooling jacket may be placed around the shield in order to dissipate the heat generated by the eddy currents. Alternatively, the eddy-current shielding could be operated at cryogenic temperatures, in which case the shield could be made even thinner because conductivity increases with decrease of temperature and thus skin depths would be smaller at lower temperatures. A cryogenic eddy-current shield may be quite attractive when the refrigeration needed for it may be obtained incrementally from the refrigeration unit already required to operate the field winding. Although typically in a synchronous electrical machine the cryogenic field winding is mounted on the rotor which is the inner member and the armature is mounted on the stator which is the outer member and the eddy-current shield is attached to the stator, this is not a necessary limitation of the invention. For either the rotor or the stator may be the inner member and the field winding may be on the stator as well as the rotor.

Figure 1:
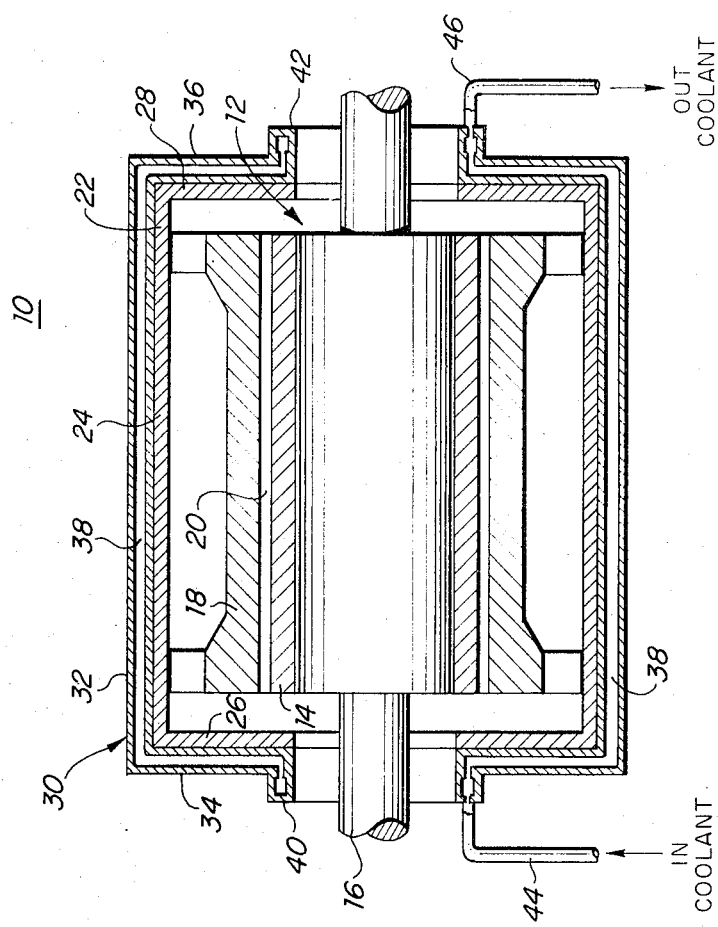
FIG. 1 is an elevational schematic cross-sectional view of a synchronous electrical machine with a superconducting field winding and an eddy-current shield according to this invention.

In one specific embodiment, FIG. 1, a synchronous electrical machine 10 includes a rotor 12 having a superconducting field winding 14 mounted for rotation with shaft 16. Armature 18 is a part of the stator the rest of which is not shown for clarity, which surrounds field winding 14 on rotor 12 and is spaced therefrom by such as air gap 20. Surrounding armature 18 and fixed to it is eddy-current shield 22 having a thickness typically of two or more skin depths, preferably several skin depths. The skin depth $\delta$ is defined as:

$$\delta = \sqrt{2/\omega\sigma\mu}$$

where $\omega$ is the operating frequency of the machine in radians per second; $\mu$ is the magnetic permeability of the shield 22 material in henrys per meter; $\rho$ is the electrical conductivity of shield 22 material in mhos per meter and $\delta$ equals the skin depth of shield 22 in meters. For operation of turbine generators and synchronous condensers at 50 or 60 cycles per second th most attractive materials for eddy-current shields are copper and aluminum. Both materials are non-magnetic, and $$\mu = \mu_0 = 4\pi 10^{-7}$$

henrys per meter and;

$$\omega = 2\pi 60 = 120\pi$$

radians per second. The conductivities at 25°C are for copper $\rho_{CU} = 5.8 \times 10^7$ mhos per meter and for aluminum $\rho_{AL} = 3.6 \times 10^7$ mhos per meter. Thus at 60 HZ the skin depths for copper and aluminum are respectively:

$$\delta_{CU} = 0.85 \text{ centimeters} = 0.34 \text{ inches}$$

$$\rho_{AL} = 1.08 \text{ centimeters} = 0.42 \text{ inches}$$

Thus a shield of 1 to 1½ inches of copper should shield adequately; whereas a shield of 1¼ to 2 inches of aluminum would suffice.

Eddy-current shield 22 includes a circumferential section 24 and two radial sections 26 and 28 extending from the ends of the circumferential section 24 radially inwardly towards shaft 16. Since eddy-current shield 22 suppresses the primary magnetic field from field winding 14 rather than absorbs it as is the case in prior art conventional machines having high permeability magnetic circuits, there is a tendency for the flux to leak out the ends of the machine in a direction parallel to shaft 16. To combat this and make the eddy-current shield 22 truly effective and competitive with a full magnetic circuit, end sections 26 and 28 are added to contain the field at both ends of the machine.

Figure 2:
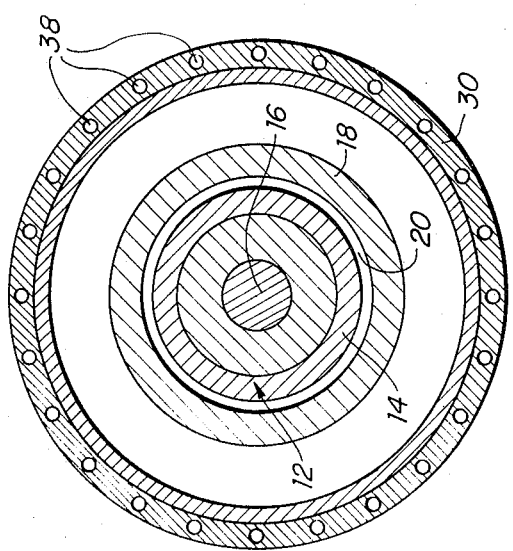
FIG. 2 is a view taken along lines 2—2 of FIG. 1.

Since eddy-current shielding is accomplished by eddy currents circulating in the shield 22 there are electrical losses associated with those currents. Adequate cooling may be provided to take this heat away from the machine especially in the case of small machines whose efficiency may be otherwise significantly reduced. For this purpose a cooling jacket 30 having a circumferential section 32 and two radial sections 34 and 36 may be provided completely surrounding eddy-current shield 22. A plurality of pipes 38, FIG. 2, may be provided in cooling jacket 30 to conduct coolant through it. Pipes extend from annular feeder ring 40 radially outward in section 34 then along circumferential section 32 and radially inward in section 36 to annular collection ring 42. Coolant is introduced to feeder ring 40 through inlet 44 and is removed from collector ring 42 through outlet pipe 46.

Other embodiments will occur to those skilled in the art and are within the following claims:

What is claimed is:

1. An eddy-current shield for containing the magnetic field in a cryogenic electrical machine having two relatively rotatable members, an armature and a cryogenic field winding, one of said members being an outer member and the other being an inner member surrounded by the outer member, comprising a symmetric cylindrical shell of highly, normally electrically conductive non-magnetic material extending at least coextensively, axially with said members and spaced outward from the outer of said members, and first and second end elements of electrically conductive material electrically interconnected with the respective ends of said shell and extending radially inwardly toward the axis of the machine.

2. The shield of claim 1 in which said shield has a thickness of several skin depths at the operating frequency of the machine.

3. The shield of claim 1 in which said shield is made of nonmagnetic material.

4. The shield of claim 1 in which said shield is made of aluminum.

5. The shield of claim 1 in which said shield is made of copper.

6. The shield of claim 1 in which said shell and said end elements are integrally formed.

7. The shield of claim 1 further including a cooling means associated with said shield for dissipating heat generated in said shield by the power loss accompanying the eddy current flow.

8. A cryogenic air-core rotating electrical machine that comprises, in combination: a cylindrical-shaped air-core armature, a cylindrical-shaped air-core cryogenic field winding, the armature and the field winding being in coaxial relationship to one another, one of the armature and the field winding being on the rotor and the other on the stator of the machine to permit relative rotation therebetween, and a solid highly normally conductive and non-magnetic eddy-current shield disposed outward from and substantially surrounding both the armature and the field winding and, in an operating system, being in relatively rotatable relationship to the field winding, said eddy-current shield extending axially along the machine at least co-extensively with the armature and the field winding and beyond the ends of both the armature and the field winding and extending radially inward toward the central longitudinal axis of the machine and as near to said axis as is mechanically possible, thereby to keep the magnetic flux of the field winding substantially wholly within the shield through eddy-current interaction between the shield and the flux.

9. Apparatus as claimed in claim 8 in which the shield has a thickness of several skin depths at the operating frequency of the machine.

10. Apparatus as claimed in claim 8 in which the field winding is a rotatable member, the armature is a non-rotatable member, the field winding being the inner of the two members and the shield being positioned outward from the armature and in fixed physical relationship thereto.

11. Apparatus as claimed in claim 10 in which the shield is made of aluminum.

12. Apparatus as claimed in claim 10 in which the shield is made of copper.

* * * * *